United States Patent [19]

Link et al.

[11] Patent Number: 4,738,171
[45] Date of Patent: Apr. 19, 1988

[54] MULTIPLE-SPINDLE LATHE

[75] Inventors: Helmut F. Link, Aichwald; Edgar Schinke, Aichwald-Aichschiess, both of Fed. Rep. of Germany

[73] Assignee: Index-Werke Komm.-Ges. Hahn & Tessky, Esslingen, Fed. Rep. of Germany

[21] Appl. No.: 31,107

[22] Filed: Mar. 26, 1987

[30] Foreign Application Priority Data

Apr. 24, 1986 [DE] Fed. Rep. of Germany ....... 3613882

[51] Int. Cl.⁴ ............................................. B23B 13/00
[52] U.S. Cl. ..................................... 82/2.5; 82/28 R; 82/40 R
[58] Field of Search ................ 82/3, 28 R, 2 R, 40 R, 82/DIG. 6, 2.5; 279/4; 409/198, 201, 216, 211, 215; 408/35, 130

[56] References Cited

U.S. PATENT DOCUMENTS 3,984,905 10/1976 Petzoldt ..................................... 82/3

FOREIGN PATENT DOCUMENTS 2338207 2/1975 Fed. Rep. of Germany .
3216892 11/1983 Fed. Rep. of Germany .
3216891 11/1983 Fed. Rep. of Germany .

Primary Examiner—Frederick R. Schmidt
Assistant Examiner—L. Cruz
Attorney, Agent, or Firm—Kramer, Brufsky & Cifelli

[57] ABSTRACT

Multiple-spindle lathe with a drive shaft which is rotatably and longitudinally displaceably mounted in a headstock, a spindle carrier which is mounted on the headstock for rotation about an indexing axis, and several work spindles which are rotatably mounted in the spindle carrier and comprise at their outer ends chucks and at their inner ends coupling elements for coupling one respective work spindle with the drive shaft. To enable retightening of the chuck of a work spindle which is driven to machine a workpiece, also while the workpiece is being machined, the work spindles are provided with double-acting pressure medium cylinders and the drive shaft with pressure medium lines, the drive shaft head and the inner work spindle ends form pressure medium coupling halves which in the case of the work spindle to be driven can be coupled by forward displacement of the drive shaft, and a pressure medium connecting device which can be coupled with the pressure medium coupling half of a non-driven work spindle is provided for actuation of the chuck thereof.

10 Claims, 7 Drawing Sheets

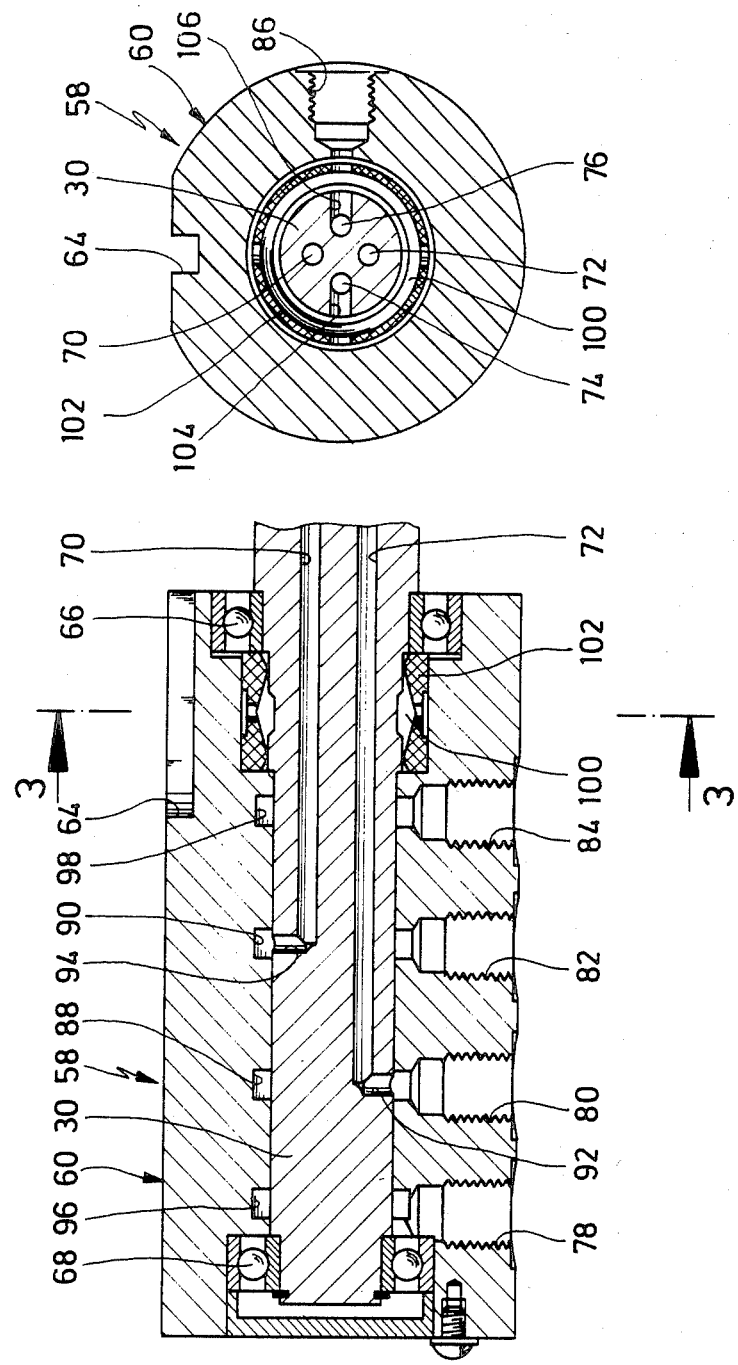

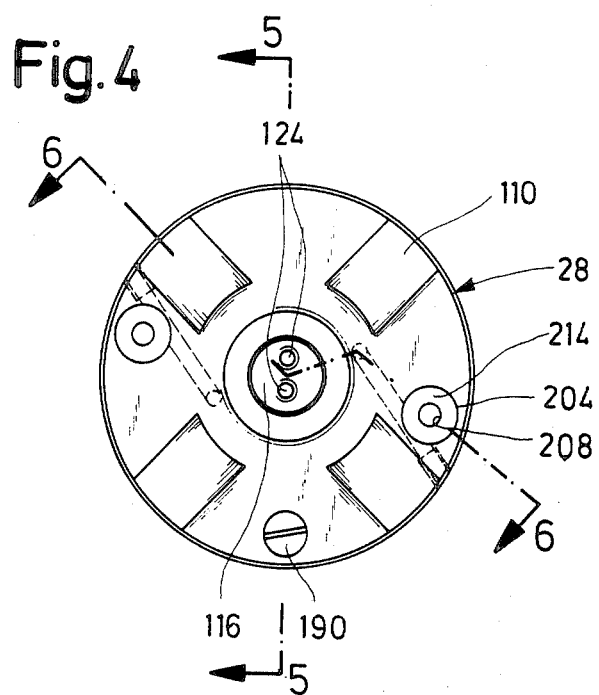

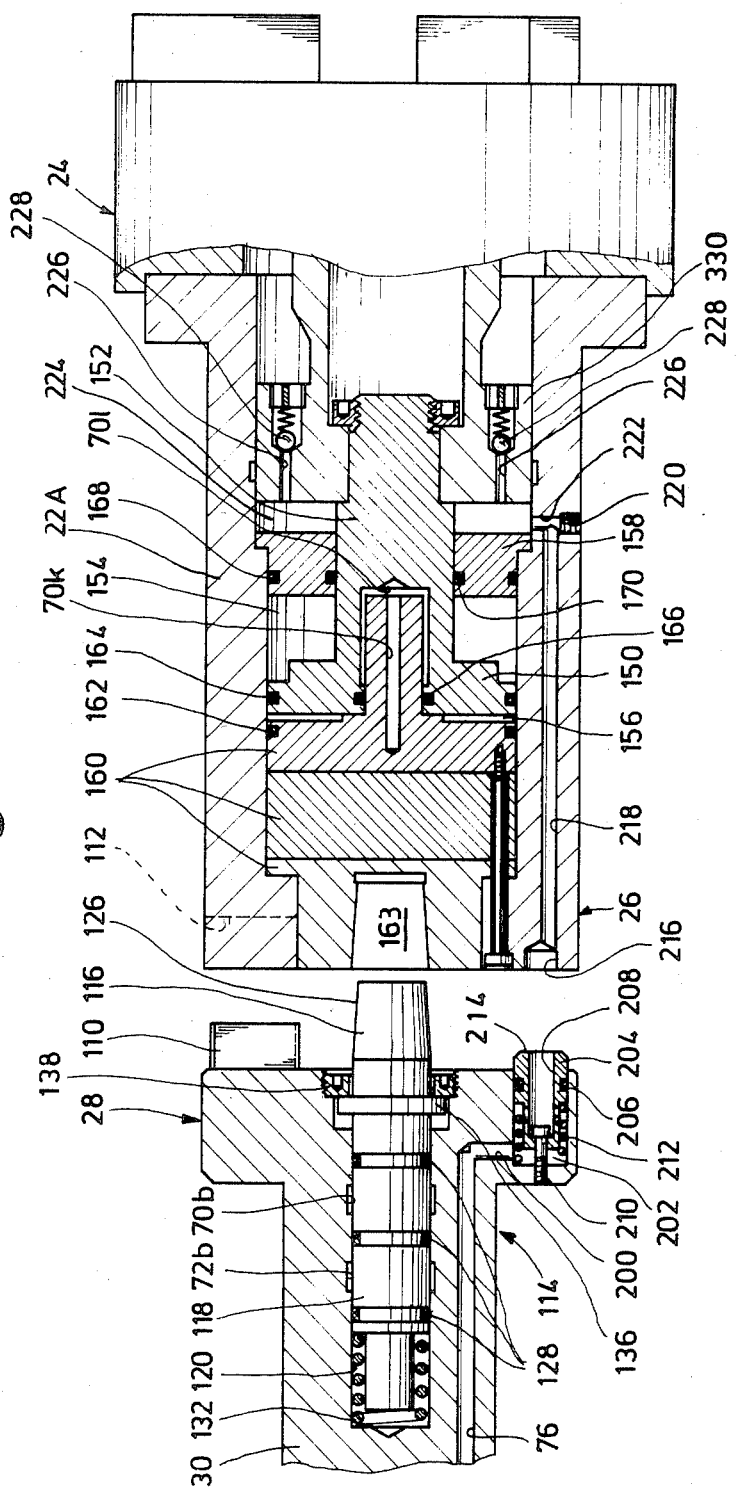

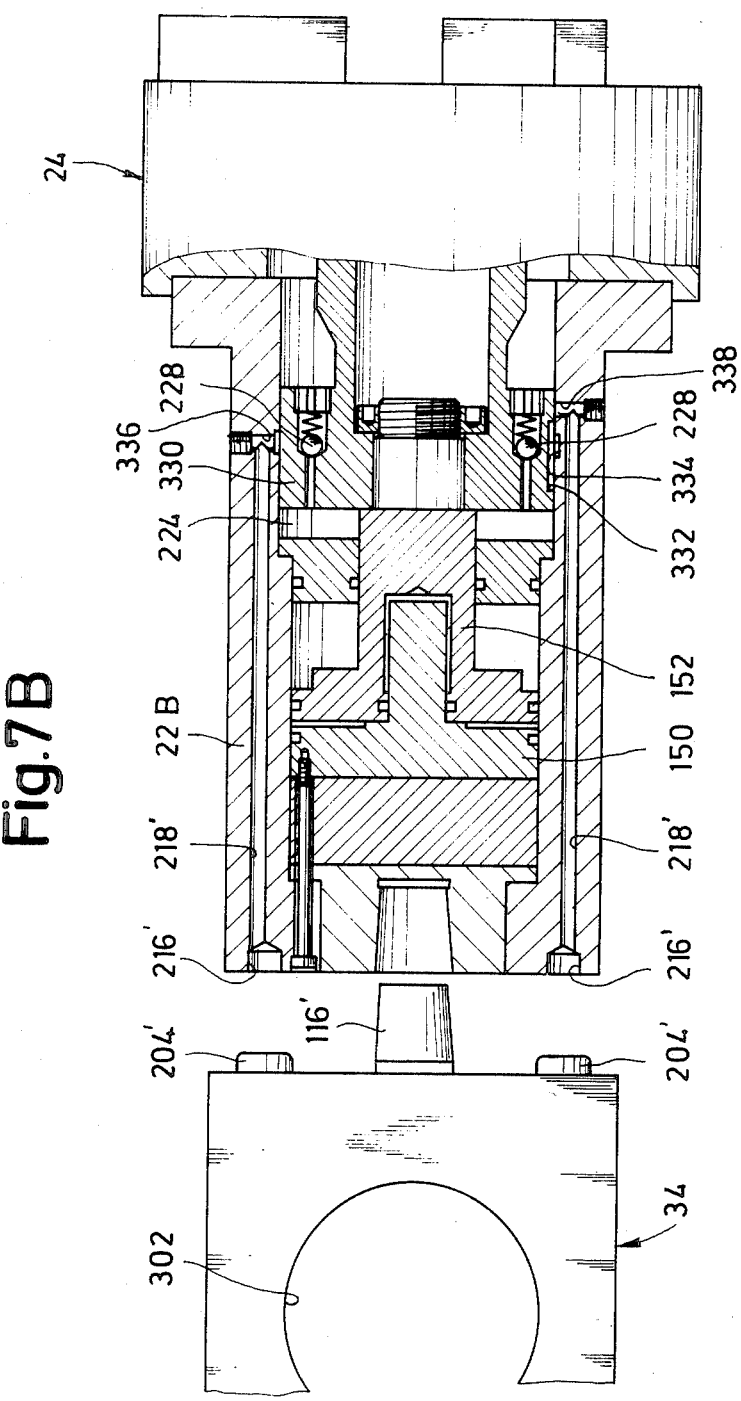

MULTIPLE-SPINDLE LATHE

The invention relates to a multiple-spindle lathe with a drive shaft which is rotatably and longitudinally displaceably mounted in a headstock, a spindle carrier which is mounted on the headstock for rotation about an indexing axis, and several work spindles which are rotatably mounted in the spindle carrier such that their axes and the indexing axis intersect at a common point of intersection on the side of the spindle carrier facing the headstock, one of the work spindles being located in a workpiece changing position to change a workpiece when another work spindle assumes a working position, with workpiece chucks carried by the work spindles at their outer ends facing away from the point of intersection of the axes, and with first drivers on the inner work spindle ends, with those of a work spindle located in the working position being engageable with second drivers carried by a head of the drive shaft by forward displacement of the drive shaft.

Such a multiple-spindle automatic turret lathe is known from German Offenlegungsschrift (unexamined patent application) No. 3,216,891 and German Offenlegungsschrift (unexamined patent application) No. 3,216,892 of the applicant company. The advantage of the design in which the axes of the work spindles intersect on the indexing axis of the spindle carrier is that the spindle carrier and the work spindles are of symmetrical construction with respect to the thermal expansions occurring during operation, whereby operating-temperature-related manufacturing inaccuracies are reduced to a minimum. This is not the case with similar known multiple-spindle lathes where the work spindle axes do not intersect—with these other known similar multiple-spindle lathes, as are to be found in German Patent Nos. 2,338,207 and 2,411,059, the work spindle axes do, in fact, also extend at an incline to one another, but tangentially to a circular cylinder about the spindle carrier indexing axis, which results in a non-thermosymmetrical spindle carrier construction. On the other hand, these known lathes with non-intersecting work spindle axes have the advantage that the work spindles can be equipped with commercially available power-operated clamping devices (workpiece chucks) since the non-intersecting work spindle axes enable mounting of the hydraulic clamping cylinders belonging to the chucks at the rear end of the corresponding work spindle and within the headstock, respectively, and displacement of the chucks via actuating rods connected to the piston rods of the clamping cylinders. Aside from the disadvantage of a non-thermosymmetrical construction, there is the further disdvantage that the work spindles are of extensive structural length and considerable forces of inertia, therefore, occur when the spindle carrier is indexed. With multiple-spindle lathes with intersecting work spindle axes it has hitherto been necessary either to equip the work spindles with chucks which are actuated by hand or by a stationary clamping power generator (poweroperated screwdriver or wrench) or to use so-called front end chucks which are temporarily connected to a pressure-fed oil source to clamp a workpiece, but are then disconnected from it again so that no leakage whatever must occur if the clamping power is to be maintained. With multiple-spindle lathes with intersecting work spindle axes it has, however, hitherto been impossible to retighten a chuck while a workpiece is being machined.

The object underlying the invention was, therefore, to produce a multiple-spindle lathe of the kind set forth at the outset, wherein the work spindle axes intersect, thereby enabling thermosymmetrical construction of the spindle carrier, and wherein the work spindles may be provided with power-operated clamping devices which are retightenable also while a work spindle is being driven.

This object is attained in accordance with the invention in that the work spindles are provided with double-acting pressure medium cylinders for actuation of the chucks, in that the drive shaft is provided with first pressure medium lines suppliable via a rotary feed mechanism, in that the drive shaft head and the inner work spindle ends each form pressure medium coupling halves which can be coupled in the case of the work spindle located in the working position by forward displacement of the drive shaft, in that the pressure medium lines of the drive shaft are connected to the pressure medium coupling half of the latter, and valves which are closed when the pressure medium coupling is disengaged are located in second pressure medium lines leading from the pressure medium coupling halves of the work spindles to the pressure medium cylinders of the latter, and in that a pressure medium connecting device is provided which in the case of a work spindle located in the workpiece changing position can be coupled with the pressure medium coupling half thereof. There is, therefore, integrated into the displaceable drive shaft of an inventive multiple-spindle lathe a pressure medium connection which is automatically coupled with that work spindle which is located in the working position when that work spindle is coupled with the drive shaft so that while a workpiece carried by that work spindle is being machined, the chuck holding it can be retightened at any time although the pressure medium cylinder actuating the chuck of a work spindle can be accommodated in the work spindle itself, more particularly, immediately adjacent to the chuck and, consequently, the work spindle axes can intersect. In accordance with the invention, means are also provided to enable actuation of the chuck of a work spindle located in the workpiece changing position. Pressure medium loss during the indexing of the spindle carrier and, consequently, when the pressure medium coupling is disengaged, is prevented by the valves referred to hereinabove so that a workpiece inserted into the chuck of a work spindle and clamped there is held firmly while this work spindle is swivelled out of the workpiece changing position into the working position or vice-versa. The pressure medium is generally hydraulic oil although it is also conceivable to use compressed air. Both hydraulic oil and compressed air can, however, be fed to the work spindles via the pressure medium coupling and/or the pressure medium connecting device, and coolants and cutting solutions can, for example, be prevented from penetrating into the interior of the work spindles by the compressed air. Also, upon completion of the workpiece machining, chips can be blown off the workpiece and out of the chuck so as not to be swivelled up with it into the workpiece changing position. Finally, a pressure medium for inquiry of the stroke of the chuck is used, in a preferred embodiment of the inventive lathe, to prevent a work spindle with a workpiece which is not correctly clamped from being transferred into the working position and driven by the drive shaft. A construction wherein each chuck comprises a pneumatic valve device for inquiry of the stroke of the chuck which is controllable by the stroke of the chuck and is connected to the pneumatic lines of the work spindle has proven particularly advantageous for this purpose. With a pressure sensor connected to one of the pneumatic lines it can then be ascertained whether the stroke of the chuck lies beyond the permissible limits.

For a multiple-spindle lathe wherein a work spindle located in the workpiece changing position is approximately vertically upwardly oriented, as in the known constructions mentioned at the outset, a pressure medium connecting device which comes from the bottom but must permit movement of the drive shaft onto the work spindle located in the working position is recommended. It is, therefore, suggested that the pressure medium connecting device be arranged under the work spindle located in the workpiece changing position, that it be raisable for coupling purposes and that it comprise at least one recess for passage of the drive shaft therethrough. The aforementioned recess may have a self-contained edge or it may be an open-edged recess so that the pressure medium connecting device may, for example, be of archway configuration. If a gear unit for rotation of the spindle carrier, as in the known multiple-spindle lathes with intersecting work spindle axes mentioned at the outset, comprises a gear shaft underneath and parallel to the drive shaft, both shafts can then extend through the opening of such an archway, but it is also conceivable to provide over one another two through-openings for these shafts in the pressure medium connecting device. In a particularly advantageous embodiment of the inventive lathe, the pressure medium connecting device is of plate configuration. Such a design has the advantage of a particularly low space requirement, and the pressure medium delivery lines to the work spindles located in the workpiece changing position and the working position cannot impede one another.

In a pressure medium coupling of a particularly simple design, pressure medium coupling halves which can be coupled with one another comprise an inside taper and a truncated cone projection fittingly insertable into the latter, with pressure medium openings in the lateral areas located opposite to one another when the pressure medium coupling is closed. It may then also be possible to dispense with separate seals, particularly if the incline of the inside taper and the truncated cone projection, respectively, is approximately 1:50.

While the configuration of truncated cone projection and inside taper is particularly recommendable for the area of the pressure medium coupling providing the hydraulic oil connection, in an embodiment of the invention the area of the pressure medium coupling provided for the compressed air is of different design: There, pressure medium coupling halves which can be coupled with one another comprise a connection piece which is resilient in the direction of the drive shaft axis and a connection opening forming a seat for the connection piece when the pressure medium coupling is closed. The connection piece can be pressed into the connection opening by, for example, a spring and/or (in the case of a piston-type construction) by the pressure medium conducted by it. In this connection, it should, however, be noted that the compressed air could just as well be connected to the work spindles through pressure medium openings in the lateral areas of inside taper and truncated cone projection and that also hydraulic oil or all of the pressure media could be conducted and connected via resilient connection pieces.

Further details of the invention are apparent from the following description and the appended drawings of a particularly advantageous embodiment of the lathe according to the invention. In the drawings:

FIG. 2 is a longitudinal sectional view through the rotary feed mechanism;

FIG. 3 is a sectional view taken on line 3—3 in FIG. 2;

FIG. 4 is an axial end view of the drive shaft;

FIG. 6 is a further longitudinal sectional view through the drive shaft head and the inner end area of the work spindle located in the working position, but taken on line 6—6 in FIG. 4;

FIG. 7B is a sectional view taken from FIG. 7A in which details of the aforementioned work spindle are illustrated, but on a different sectional plane than in FIG. 7A.

Figure 1:
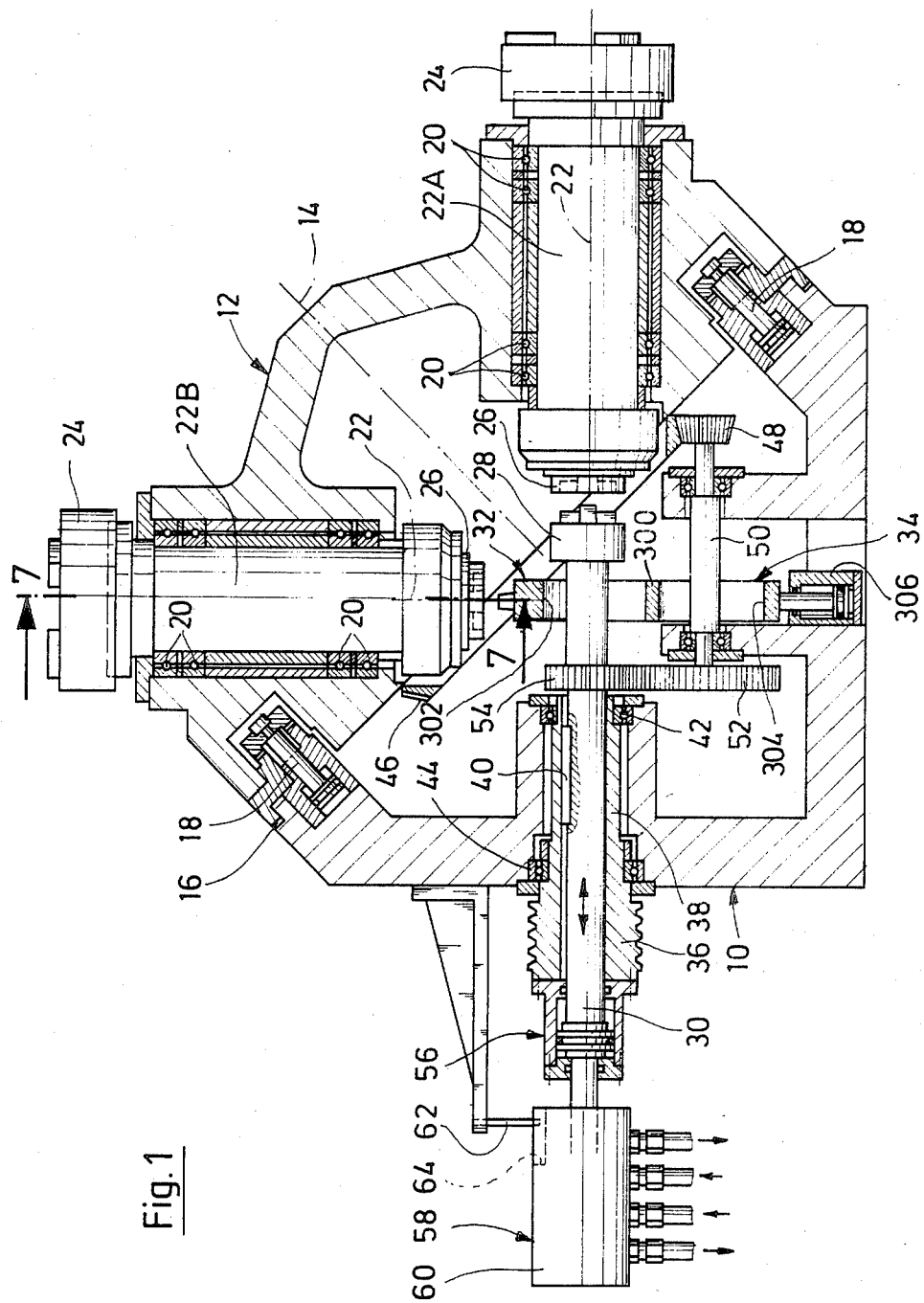
FIG. 1 is a diagrammatic longitudinal sectional view through the headstock and the spindle carrier of the inventive lathe, but with the rotary feed mechanism for the drive shaft shown from the side.

FIG. 1 shows parts of a headstock 10 on which a spindle carrier 12 is rotatably mounted, in particular, such that it is rotatable about an indexing axis 14 at least through 180 degrees, but preferably through a full 360 degrees. At the same time, however, means are provided for locking the spindle carrier on the headstock so that it cannot rotate unintentionally. These means are crown-shaped spur gearings 16 which normally mesh, but one of which is raisable from the other with the aid of pressure medium cylinders 18, whereupon the spindle carrier 12 is rotatable. Two work spindles designated in their entirety by 22A and 22B are rotatably, but axially immovably mounted in the spindle carrier 12 with the aid of bearings 20. One work spindle assumes its working position in which a workpiece held by it can be machined by tools, not illustrated, when the work spindle axis extends horizontally, as is the case with work spindle 22A, whereas work spindle 22B—in the position in which the spindle carrier 12 is illustrated—is in the workpiece changing position in which the work spindle axis 22 extends vertically. In the preferred embodiment of the inventive lathe, the axes of the two work spindles 22A and 22B, therefore, include an angle of 90 degrees, with the indexing axis 14 constituting the bisector in view of the desired thermosymmetrical construction, and the work spindle 22A is transferable into the vertical workpiece changing position by rotation of the spindle carrier 12 through 180 degrees, whereupon the work spindle 22B assumes the working position. In the illustrated preferred embodiment of the inventive lathe, the spindle carrier 12 is equipped with two work spindles 22A, 22B, but it is also possible to provide a larger number of work spindles in the work spindle carrier, for example, four work spindles so that the next work spindle is brought into the working position and the workpiece changing position, respectively, by rotation of the spindle carrier 12 through 90 degrees about the indexing axis 14.

Each of the work spindles carries at its outer end a chuck 24 which is actuatable by a double-acting hydraulic cylinder which will be explained in greater detail hereinafter. The inner end of each work spindle facing the headstock 10 carries a pressure medium coupling half 26 for cooperation with a pressure medium coupling half 28 of a drive shaft 30 and a pressure medium coupling half 32 of a pressure medium connecting device designated in its entirety by 34, respectively. The drive shaft 30 is longitudinally displaceably mounted in a hollow shaft 38 which is coaxial with the latter and is provided with a belt pulley 36. The drive shaft 30 is connected via a key 40 to the hollow shaft 38 for rotation therewith and is, therefore, drivable via the belt pulley 36. Finally, the hollow shaft 38 is rotatably, but axially immovably mounted in the headstock 10 with the aid of bearings 42 and 44.

The spindle carrier 12 is rotationally drivable by a gear rim 46 attached to the latter, a gear 48 on an intermediate shaft 50 rotatably mounted in the headstock 10 which meshes with the gear rim, and two gears 52 and 54 on the intermediate shaft and the drive shaft 30, respectively. As shown in FIG. 1, the gears 52 and 54 engage when the drive shaft 30 assumes its left end position, in accordance with FIG. 1, in which the pressure medium coupling halves 28 of the drive shaft 30 and 26 of the work spindle 22A are disengaged and the spindle carrier 12 is, therefore, rotatable about the indexing axis 14.

The drive shaft 30 is axially displaceable by a double-acting pressure medium cylinder 56 whose piston rod constitutes the drive shaft 30 and whose actual cylinder is firmly connected to the belt pulley 36. Accordingly, the drive shaft 30 is rightwardly displaceable out of its left end position, in accordance with FIG. 1, until the pressure medium coupling halves 26 and 28 engage, and the drive shaft 30 is also withdrawable again from the work spindle located in the working position with the aid of this pressure medium cylinder. As will be explained in detail hereinafter, a rotary feed mechanism 58 carried by the headstock 10 serves to connect pressure-fed oil, i.e., hydraulic oil and compressed air lines which are integrated into the drive shaft 30 with corresponding pressure medium sources.

As is apparent from FIG. 2, the rotary feed mechanism 58 comprises a housing 60 which is displaceable together with the drive shaft 30 but is prevented from rotating with the drive shaft 30 by an arm 62 of the headstock 10 shown in FIG. 1 which engages a groove 64 in the housing 60. The left end of the drive shaft 30, in accordance with the drawing, is rotatably, but axially immovably mounted in bearings 66 and 68 in the housing 60. Four pressure medium lines in the form of bores, more particularly, two hydraulic lines 70 and 72 and two compressed air lines 74 and 76 are integrated into the drive shaft 30. The housing 60 comprises five connecting bores 78, 80, 82, 84 and 86 (the latter is shown in FIG. 3), provided with internal threads for connecting pressure lines. The connecting bores 80 and 82 communicate via annular channels 88 and 90 of housing 60 and transverse bores 92 and 94 of drive shaft 30 with hydraulic lines 70 and 72, while connecting bores 78 and 84 together with annular channels 96 and 98 of housing 60 serve to carry off leaking oil. It is expedient to provide annular gap seals, not illustrated in greater detail, between the annular channels 96, 88, 90 and 98. The connecting bore 86 is intended for connection of a compressed air line. This connecting bore opens into an annular channel 100, delimited, on the one hand, by the drive shaft 30 and, on the other hand, by a seal 102 held by the housing 60, and two transverse bores 104 and 106 of drive shaft 30 which lead to the compressed air lines 74 and 76, respectively, open into the annular channel.

If longitudinal displacement of the housing 60 of rotary feed mechanism 58 is to be avoided, it is, of course, possible to divide drive shaft 30 and construct it telescopically so that the part of the drive shaft 30 shown in FIG. 1 is movable back and forth, while the part of drive shaft 30 shown in FIG. 2 is immovable, but the sections of the pressure medium lines integrated into the two drive shaft parts sealingly communicate with one another.

The hydraulic oil connection to the work spindle 22A located in the working position and the actuation of the chuck 24 of the work spindles will now be explained in further detail with reference to FIGS. 4, 5A and 5B.

Figure 5A:
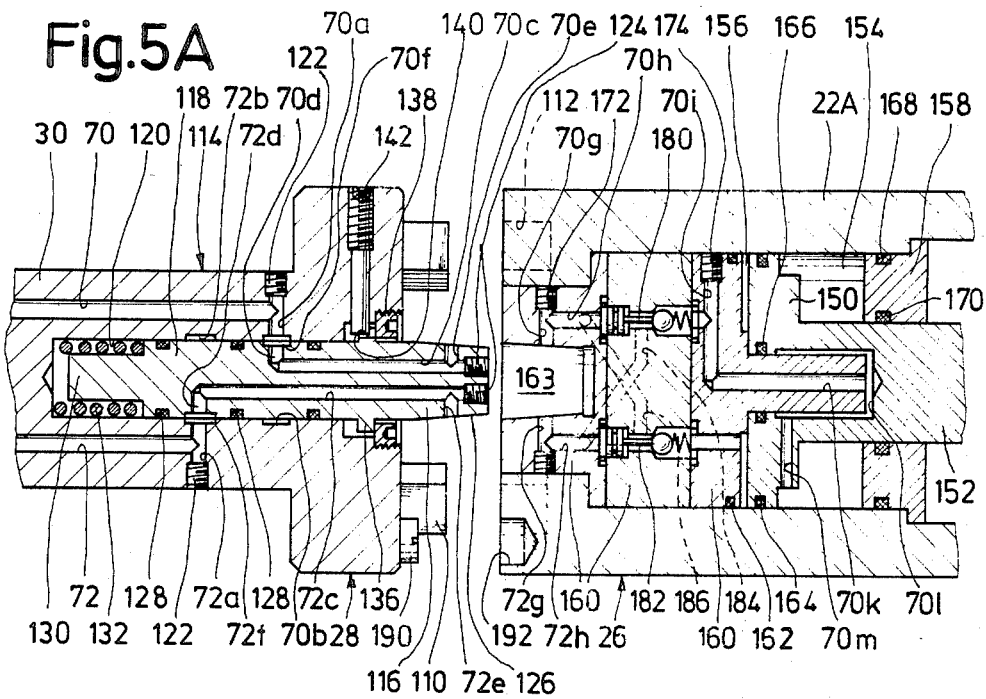
FIG. 5A is a longitudinal sectional view through the drive shaft head and the inner end area of the work spindle located in the working position, taken on line 5—5 in FIG. 4 when the pressure medium coupling is disengaged.
Figure 5B:
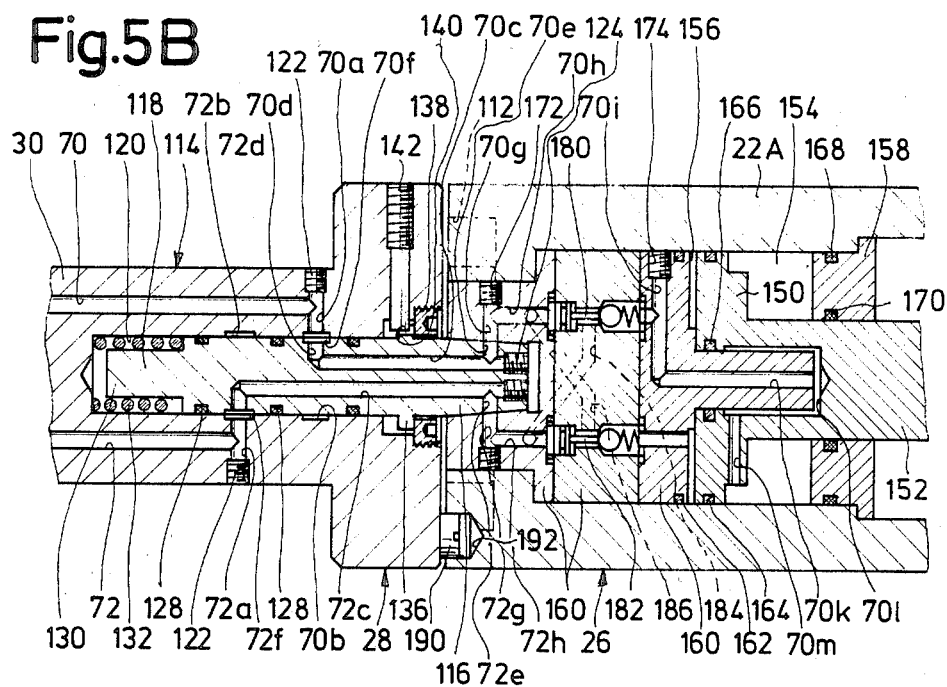
FIG. 5B is the same longitudinal sectional view as in FIG. 5A but when the pressure medium coupling is engaged.

The pressure medium coupling half 28 illustrated in the uncoupled state in FIG. 5A comprises four driver elements 110 in the form of sliders for which the work spindle 22A and likewise the work spindle 22B each comprise four correspondingly designed driver elements 112 in the form of end face recesses to enable the respective work spindle to be driven after rightward displacement of the drive shaft 30 into the position shown in FIG. 5B. Aside from a conical projection 116 protruding out of the drive shaft head 114, there is, furthermore, axially displaceably mounted in the head 114 of the drive shaft 30 shown in FIGS. 5A and 5B an oil supplying member 118 of circular-cylindrical configuration, for which purpose a bore 120 is provided in the drive shaft head. Transverse bores 70a and 72a closed on the outside by threaded plugs 122 open into the circumferential wall of this bore and connect the hydraulic lines 70, 72 with one of two annular channels 70b and 72b, respectively, provided in the circumferential wall of the bore 120. The oil supplying member 118 is provided with axially extending hydraulic bores 70c and 72c, into each of which two transverse bores open, namely transverse bores 70d and 70e and 72d and 72e, respectively, and the transverse bores 70d and 72d end at longitudinal grooves 70f and 72f which permit a certain longitudinal displacement of the oil supplying member 118 relative to the drive shaft 30 without the connection between the transverse bores 70a and 70d and 72a and 72d, respectively, being interrupted. At the end face of the oil supplying member 118, the hydraulic bores 70c and 72c are closed by threaded plugs 124, while the transverse bores 70e and 72e open into the conical circumferential surface 126 of the projection 116. Three annular seals 128 serve to seal the annular channels 70b and 72b. The inner end of the oil supplying member 118 is in the form of a circular-cylindrical projection 130 of somewhat smaller diameter so that a compression spring 132 which prestresses the oil supplying member 118 rightwardly, in accordance with FIGS. 5A and 5B, can be accommodated in the bore 120. To hold the oil supplying member 118 in the drive shaft head 114, there is formed on the oil supplying member a collar 136 which cooperates with a nut 138 with front holes which is screwed into the drive shaft head 114 at the end face thereof for axial securing purposes. To prevent rotation of the oil supplying member 118 there is machined into the collar 136 a groove 140 with which a stud bolt 142 screwed into a bore of the drive shaft head 114 engages.

Since conventional chucks are actuatable by an element displaceable in the longitudinal direction of the respective work spindle, there is integrated into each work spindle, i.e., in the case illustrated in FIGS. 5A and 5B, into work spindle 22A, a double-acting hydraulic cylinder which consists of a piston 150 with a piston rod 152 to actuate the chuck and two cylinder chambers 154 and 156 on either side of the piston 150. To delimit the cylinder chamber 154 on the side facing away from the piston there is inserted into the work spindle comprised of a hollow shaft an annular disk 158, through which the piston rod extends, while the cylinder chamber 156 is delimited by an insert 160 which for manufacturing reasons only is made up of three parts. A total of five annular seals 162, 164, 166, 168 and 170 is provided to seal the cylinder chambers.

The insert 160 and likewise the left end face of the work spindle, in accordance with the drawings, constitute a component of the pressure medium coupling half 26 of the work spindle. For this reason, there is machined in the left end face of the insert 160, in accordance with the drawings, an inside taper 163 into which the conical projection 116 can be pressed so as to fit exactly into it. In the preferred embodiment, the outer circumferential surface 126 of the projection 116 and the circumferential surface of the inside taper 163 have identical inclines of 1:50. At those points at which the transverse bores 70e and 72e lie when the projection 116 is pressed into the inside taper 163, the insert 160 comprises transverse bores 70g and 72g which are closed on the outer circumference of the insert 160 by threaded plugs 172 and into which axially extending, stepped longitudinal bores 70h and 72h open, the latter of which opens into the cylinder chamber 156 while the longitudinal bore 70h opens into a transverse bore 70i of the insert 160 which again is closed on the outside by a threaded plug 174 and leads to a central longitudinal bore 70k. The latter opens into a cavity 701 of the piston rod 152 from which a radial transverse bore 70m in the piston 150 leads into the cylinder chamber 154. Each of the longitudinal bores 70h and 72h accommodates an unblockable check valve 180 and 182, respectively, serving to maintain the pressure existing in the cylinder chambers 154 and 156, i.e., to prevent escape of hydraulic oil via the inside taper 163 when the pressure medium coupling 26, 28 is disengaged. The check valves 180 and 182 are always unblocked when the pressure in the transverse bore 70g and the transverse bore 72g, respectively, is greater than the pressure in the cylinder chamber 154 and 156, respectively, and on account of the construction of the check valves 180 and 182, the insert 160 comprises transverse bores 184 and 186 which do not intersect but merely join the longitudinal bores 70h and 72h, in particular, at points lying in front of the check valves, i.e., in front of the spherical-head-shaped valve members of the check valves.

To enable coupling of pressure medium coupling halves 26 and 28 relative to one another only in such rotary angular positions in which the transverse bores 70e and 72e establish a connection with the transverse bores 70g and 72g, the pressure medium coupling half 28 is provided with fixing screws 190 on the end face and the work spindle 22A and 22B, respectively, with correspondingly dimensioned blind holes 192 on the end face for engagement with the fixing screws.

If the drive shaft 30 is displaced rightwardly, in accordance with FIGS. 1 and 5A, with the aid of the pressure medium cylinder 56 until the driver elements 110 engage the driver elements 112, the projection 116 is pushed into the inside taper 163 and sealingly pressed by the compression spring 132 against the circumferential surface of the inside taper 163. When the pressure medium coupling half 28 is then supplied with pressure-fed oil, the check valves 180 and 182 open and the piston 150 and thus the piston rod 152 are, therefore, displaceable in one of the two axial directions. It is advisable to make the hydraulic lines 70 and 72 pressureless before the pressure medium coupling half 28 is uncoupled in order to avoid hydraulic oil losses through the open transverse bores 70e and 72e, for which purpose controllable valves are provided upstream from the rotary feed mechanism 58. It is, however, also possible to provide unblockable check valves in the drive shaft head 114 as close as possible to the transverse bores 70e and 72e.

FIG. 6 shows how the work spindle 22A is supplied with compressed air, with the course of line 6—6 in FIG. 4 resulting in only one of the two compressed air lines 74, 76 being shown in FIG. 6, namely the compressed air line 76 in the form of a longitudinal bore. The latter leads in the pressure medium coupling half 28 to a transverse bore 200 which leads into a cylinder chamber 202 in the form of a blind hole provided in the drive shaft 30. A piston 204 is displaceably guided in the axial direction of the drive shaft 30 in this cylinder chamber and together with a sealing ring 206 closes off the cylinder chamber 202 on the end face of the drive shaft head. The piston 204 which is provided with a stepped longitudinal bore 208 is axially secured with the aid of a securing element 210 in the form of a pin provided with a head which is attached in the drive shaft. A compression spring 212 serves to axially prestress the piston 204 outwardly. When the pressure medium coupling 26, 28 is in the coupled state, the front end surface 214 of the piston 204 rests flat against the end face of the work spindle 22A, and the piston is pressed by the air pressure present at the compressed air line 76 and the compression spring 212 against the opening of a blind hole 216 in the end face of the work spindle opposite the piston 204, whereby a sealed pneumatic connection is established with the work spindle. To avoid compressed air losses when the pressure medium coupling half 28 is uncoupled from the work spindle, it is advisable to also provide controllable valves for the compressed air lines, in particular, magnetic valves which, in turn, may be arranged upstream from the rotary feed mechanism 58.

A longitudinal bore 218 of the work spindle 22A located in the working position opens into the blind hole 216 and communicates with a inner area 224 of the work spindle via a transverse bore 222 closed on the outside by a threaded plug 220. Longitudinal bores 226 lead from the inner area into the area of the chuck 24 and contain check valves 228.

Introduction of compressed air into the inner area of the work spindle prevents coolants and cutting solutions from penetrating into the interior of the work spindle, and when the check valves 228 are open, chips and coolant or cutting solution can be blown away from the chuck 24 and a workpiece held by it before the respective work spindle is swivelled upwardly out of the working position into the workpiece changing position.

Figure 7A:
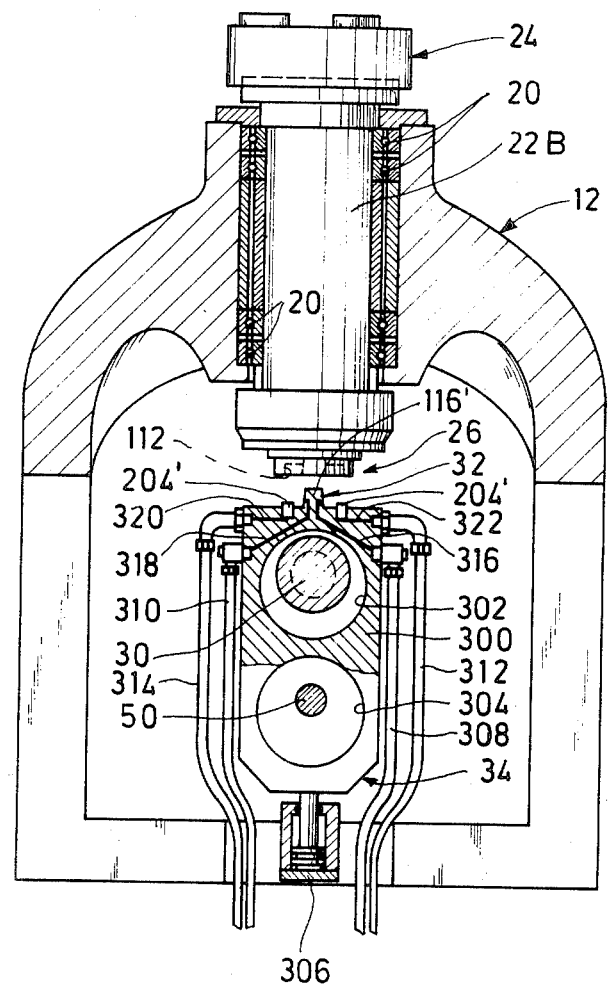
FIG. 7A is a vertical sectional view taken transversely to the drive shaft axis through headstock and spindle carrier on line 7—7 in FIG. 1, but without any details of the work spindle located in the workpiece changing position.

FIGS. 7A and 7B which will be explained hereinafter with reference to FIG. 1 show the pneumatic supply of the work spindle 22B in the workpiece changing position. As is apparent from FIGS. 1 and 7A, the pressure medium connecting device 34 comprises a main body 300 in the form of a flat plate with two openings 302 and 304 overlying each other for passage of the drive shaft 30 and the intermediate shaft 50 therethrough. The diameter of these openings is large enough to enable the main body 300 to be raised out of the position shown in FIGS. 1 and 7A and lowered again with the aid of a pressure medium cylinder 306 held by the headstock 10 in order to couple the pressure medium connecting device 34 with the pressure medium coupling half 26 of the work spindle 22B. Two flexible hydraulic lines 308 and 310 and also two flexible pneumatic lines 312 and 314 are connected to the main body 300 and since the design of the pressure medium coupling half 32 of the pressure medium connecting device 34 corresponds substantially to the design of the pressure medium coupling half 28 and the pressure medium coupling halves 26 of all work spindles are identical, it need only be briefly indicated that bores 316 and 318 in the main body 300 connect the hydraulic lines 308 and 310 to a conical projection 116' corresponding to the projection 116 of the pressure medium coupling half 28, and that bores 320 and 322 machined in the main body 300 connect the pneumatic lines 312 and 314 with two pistons 204' which correspond to the pistons 204 of the pressure medium coupling half 28.

Two pneumatic lines in the form of two longitudinal bores 218' machined in the work spindles, such as work spindle 22B, for pneumatically checking the stroke of the chuck 24, and two blind holes 216' corresponding to blind holes 216, with the longitudinal bores 218' opening into them, are illustrated in FIG. 7B. While both pneumatic lines, i.e., both longitudinal bores 218 in a work spindle located in the machining position, such as work spindle 22A, serve to blow obstructions out of the work spindle and perform the same function, in accordance with the invention, one pneumatic line, in a work spindle located in the workpiece changing position, namely the lower longitudinal bore 218', in accordance with FIG. 7B, serves to supply the compressed air, while the other pneumatic line, i.e., the upper longitudinal bore 218', in accordance with FIG. 7B, serves to feed the compressed air back, in order to be able to inquire together with a valve arrangement of inventive design the clamping distance covered by chuck 24, i.e., its clamping jaw.

In principle, any valve arrangement controlled by an element which moves together with the clamping elements of the chuck is suitable. The design is, however, made particularly simple by an actuating flange 330 of the chuck which also closes off the inner area 224 of the work spindle from the work area of the lathe and is longitudinally displaceably guided in the work spindle and connected to the piston rod 152 comprising on its outer circumference a recess, in particular, in the form of a longitudinal groove 332, and either joining or separating the two longitudinal bores 218', like a valve slide, depending on whether the clamping elements of the chuck 24 assume positions within or beyond predetermined limits. For this purpose, an annular channel 334 communicating via a transverse bore 336 with the longitudinal bore 218' for feeding back the compressed air is machined in the inside wall of the actual work spindle 22A and 22B, respectively, comprised of a hollow shaft, while the longitudinal bore 218' for feeding the compressed air opens into a transverse bore 338 which is axially offset relative to the annular channel 334 in dependence upon the length of the longitudinal groove 332 such that the two longitudinal bores 218' can only communicate with each other when the stroke of the chuck lies within the permissible limits. In accordance with the invention, the actual work spindle and a longitudinally displaceable chuck element, therefore, constitute a slide valve. To inquire the stroke of the chuck, it is then only necessary to provide a pressure sensor, not illustrated, which communicates with the pneumatic line for the compressed air feedback, i.e., in the illustrated embodiment, with longitudinal bore 218' at the top of FIG. 7B. If the pressure sensor which is preferably in the form of a pressure switch ascertains the presence of pneumatic pressure at this pneumatic line, the clamping elements of the chuck assume positions which lie within admissible limits. If this is not the case, the pressure sensor does not generate the signal constituting one of the preconditions for starting the lathe, and the machine can, therefore, not start up.

If the check valves 228 and the pressure sensor were of appropriate design, the longitudinal bores 218 shown in FIG. 6 could also be used instead of separate longitudinal bores 218' to pneumatically check the chuck, i.e., if an air pressure which is too low to open the check valves 228 were adequate for pneumatically checking the chuck.

What is claimed is:

1. Multiple-spindle lathe with a drive shaft which is rotatably and longitudinally displaceably mounted in a headstock, a spindle carrier which is mounted on the headstock for rotation about an indexing axis, and several work spindles which are rotatably mounted in the spindle carrier such that their axes and the indexing axis intersect at a common point of intersection on the side of the spindle carrier facing the headstock, one of the work spindles being located in a workpiece changing position to change a workpiece when another work spindle assumes a working position, with workpiece chucks carried by the work spindles at their outer ends facing away from the point of intersection of the axes, and with first drivers on the inner work spindle ends, with those of a work spindle located in the working position being engageable with second drivers carried by a head of the drive shaft by forward displacement of the drive shaft, characterized in that the work spindles (22A, 22B) are provided with double-acting pressure medium cylinders (150, 154, 156) for actuation of the chucks (24), in that the drive shaft (30) is provided with first pressure medium lines (70, 72, 74, 76) suppliable via a rotary feed mechanism (58), in that the drive shaft head (114) and the inner work spindle ends each form pressure medium coupling halves (28, 26) which can be coupled in the case of the work spindle (22A) located in the working position by forward displacement of the drive shaft (30), in that the pressure medium lines of the drive shaft are connected to the pressure medium coupling half (28) of the latter, and valves (180, 182) which are closed when the pressure medium coupling (26, 28, 32) is disengaged are located in second pressure medium lines (70g, 70h, 70i, 70k, 70l, 70m, 72g, 72h) leading from the pressure medium coupling halves (26) of the work spindles (22A, 22B) to the pressure medium cylinders of the latter, and in that a pressure medium connecting device (34) is provided which in the case of a work spindle (22B) located in the workpiece changing position can be coupled with the pressure medium coupling half (26) thereof.

2. Lathe as defined in claim 1, characterized in that the pressure medium coupling halves (26, 28, 32) are connected to hydraulic and pneumatic lines (70, 72, 74, 76, 70g, 72g, 218, 218', 308, 310, 312, 314).

3. Lathe as defined in claim 2, characterized in that the pressure medium connecting device (34) is connected to hydraulic and pneumatic lines (308, 310, 312, 314).

4. Lathe as defined in claim 3, characterized in that each chuck (24) comprises a pneumatic valve device (332, 334, 338) controllable by the stroke of the chuck and connected to the pneumatic lines (218') of the work spindle (22A, 22B) for inquiry of the stroke of the chuck.

5. Lathe as defined in one of claims 1 to 4, wherein a work spindle located in the workpiece changing position is oriented approximately vertically upwardly, characterized in that the pressure medium connecting device (34) is arranged under this work spindle (22B), is raisable for coupling purposes and is provided with at least one recess (302, 304) for passage of the drive shaft (30) therethrough.

6. Lathe as defined in claim 5, characterized in that the pressure medium connecting device (34) is in the form of a plate (300).

7. Lathe as defined in claim 1, characterized in that pressure medium coupling halves (26, 28, 32) which can be coupled with one another comprise an inside taper (163) and a truncated cone projection (116, 116') which can be fittingly inserted into the latter, with pressure medium openings (70g, 72g70e, 72e) in the circumferential surfaces of said taper and said cone projection which openings are located opposite one another when the pressure medium coupling (26, 28; 26, 32) is closed.

8. Lathe as defined in claim 7, characterized in that the incline of the inside taper and the truncated cone, respectively, is approximately 1:50.

9. Lathe as defined in claim 1, characterized in that pressure medium coupling halves which can be coupled with one another comprise a connection stud (204, 204') which is resilient in the direction of the drive shaft axis and a connection opening (216, 216') which forms a seat for the connection stud when the pressure medium coupling is engaged.

10. Lathe as defined in claims 2, 7 or 9, characterized in that the projection (116, 116') communicates with the hydraulic lines and the connection stud (204, 204') with the pneumatic lines.

* * * * *